US011075708B2

(12) United States Patent
Yavuz et al.

(10) Patent No.: US 11,075,708 B2
(45) Date of Patent: Jul. 27, 2021

(54) METHOD AND APPARATUS FOR ADJACENT CHANNEL INTERFERENCE MITIGATION

(71) Applicant: Celona, Inc., Cupertino, CA (US)

(72) Inventors: Mehmet Yavuz, Palo Alto, CA (US); Nagi Mahalingam, San Diego, CA (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 16/703,560

(22) Filed: Dec. 4, 2019

(65) Prior Publication Data
US 2021/0175992 A1    Jun. 10, 2021

(51) Int. Cl.
*H04W 24/00*    (2009.01)
*H04J 11/00*    (2006.01)
*H04L 5/14*    (2006.01)
*H04L 27/26*    (2006.01)
*H04W 24/10*    (2009.01)
*H04W 16/14*    (2009.01)

(52) U.S. Cl.
CPC ........ *H04J 11/0056* (2013.01); *H04L 5/1469* (2013.01); *H04L 27/2691* (2013.01); *H04W 16/14* (2013.01); *H04W 24/10* (2013.01)

(58) Field of Classification Search
CPC H04J 11/0056; H04L 5/1469; H04L 27/2691; H04W 16/14; H04W 24/10
USPC ........................................................ 455/454
See application file for complete search history.

(56) References Cited

U.S. PATENT DOCUMENTS

| 2003/0207669 | A1  | 11/2003 | Kroeger |
| 2007/0297323 | A1* | 12/2007 | Seki ................ H04L 5/023 370/208 |
| 2008/0132225 | A1* | 6/2008  | Ranta .............. H04J 11/0093 455/424 |
| 2011/0021153 | A1  | 1/2011  | Safavi |
| 2012/0177095 | A1  | 7/2012  | Haran et al. |
| 2015/0326463 | A1  | 11/2015 | Solondz |
| 2016/0029224 | A1  | 1/2016  | Edge |
| 2016/0330645 | A1* | 11/2016 | Mishra ............. H04W 28/0273 |

(Continued)

OTHER PUBLICATIONS

Almeida, et al., "Mitigating Adjacent Channel Interference in Vehicular Communication Systems", Digital Communications and Networks 2.2 (2016): 57-64, Mar. 29, 2016.

(Continued)

*Primary Examiner* — Mark G. Pannell
(74) *Attorney, Agent, or Firm* — Jaquez Land Greenhaus & McFarland LLP; Bruce W. Greenhaus, Esq.

(57) ABSTRACT

Systems and methods for mitigation of cross channel interference are disclosed in which the TDD configuration of a potential cross channel interference source is detected by received signals within the network with which the source interferes. The TDD configuration is then used to synchronize the transmissions from the network with which the source interferes to reduce the interference. In addition, interference is mitigated by providing adaptive guard bands based on results of a radio frequency environmental survey and/or coaxing an interfering user to another channel. Sub-channels can be assigned based on the results of the radio frequency environmental survey and Quality of Service requirements for traffic flows.

5 Claims, 15 Drawing Sheets

(56) References Cited

U.S. PATENT DOCUMENTS

| | | | |
|---|---|---|---|
| 2017/0142702 A1* | 5/2017 | Yu | H04W 72/0406 |
| 2018/0048511 A1* | 2/2018 | Hakola | H04J 11/003 |
| 2019/0174427 A1* | 6/2019 | Beattie, Jr. | H04W 72/0453 |
| 2019/0230619 A1* | 7/2019 | Cui | G01S 5/0236 |
| 2019/0268198 A1* | 8/2019 | Oketani | H04W 72/04 |

OTHER PUBLICATIONS

Copenheaver, Blaine R., International Search Report and Written Opinion received from the USRO dated Mar. 30, 2021 for appln. No. PCT/US2020/063076, 13 pgs.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 2
(PRIOR ART)

METHOD AND APPARATUS FOR ADJACENT CHANNEL INTERFERENCE MITIGATION

BACKGROUND

(1) Technical Field

The disclosed method and apparatus generally relate to systems for preventing interference between communications networks. In particular, the disclosed method and apparatus prevents interference by transmitters of a first communications network with receivers of a nearby second network operating on adjacent frequencies.

(2) Background

FIG. 1 is an illustration of a basic configuration for a communication network, such as a "4G LTE" (fourth generation Long-Term Evolution) or "5G NR" (fifth generation New Radio) network, in which user equipment (UE) communicates with a base station/access point (BS/AP). The term UE refers to a wide array of devices having wireless connectivity, such as a cellular mobile phone, Internet of Things (IoT) devices, virtual reality googles, robotic device, autonomous driving machines, smart barcode scanners, and communications equipment, which includes cell phones, desktop computers, laptop computers, tablets and other types of personal communications devices. Throughout this disclosure, the term BS/AP is used broadly to include at least an extended NodeB (eNB) or gNB of an LTE/5G network, a cellular base station (BS), a Citizens Broadband Radio Service Device (CBSD), a WiFi access node, a Local Area Network (LAN) access point, a Wide Area Network (WAN) access point, etc. and should also be understood to include other network receiving hubs that provide wireless access by a plurality of wireless transceivers to a network. Accordingly, in some cases, a UE 101 uses a BS/AP 103 to gain access to a network of other devices and services. 5G technology supports both public networks and private networks, such as cellular networks and enterprise networks. Private networks are operated for use by a limited group of authorized users, whereas public networks are open for use by anyone that subscribes to the service by the network operator. An enterprise network is one particular type of private network operated by an organization for use by the members of the organization. Other types of private networks may be operated by a private network manager for use by more than one organization.

In both cellular networks, such as the network shown in FIG. 1, and in private networks, the BS/AP 103 can receive signals from, and send signals to, the UE 101. The BS/AP 103 is typically coupled to a core network 105. The core network 105 allows information to flow between the network and other networks, such as the Public Switched Telephone Network (PSTN) and the internet 107. Such networks facilitate the use of different IP applications, such as computer vision, IP video, robotics control, etc. In addition, such networks facilitate "edge computing" in which computing is distributed. In some cases, edge computing is implemented using an open IT architecture that features decentralized processing power, enabling mobile computing and Internet of Things (IoT) technologies. In edge computing, data is processed by the device itself or by a local computer or server, rather than being transmitted to a data center.

Wireless data transmission between a UE 101 and the BS/AP 103 occurs on an assigned frequency channel. In 4G LTE or 5G NR systems operating in TDD (time division duplex) mode, wireless transmissions over both the downlink (DL) and the uplink (UL) use the same frequency (i.e., channel). This can be done without interference by transmitting the signals on the UL (i.e., from the UE to the BS/AP) at different times then the DL transmissions (i.e., from the BS/AP to the UE). A transmission pattern, commonly referred to as a TDD configuration, is used to determine the times at which DL and UL transmissions to a particular device will occur. In accordance with the TDD configuration, transmissions on the UL occur during predetermined time slots, referred to as "U subframes" and to transmissions on the DL occur during predetermined non-overlapping "D subframes". In addition, special "S subframes" are used for signaling in LTE-TDD systems. As an example, in 4G LTE-TDD, each subframe is 1 ms in length.

FIG. 2 shows a table of 4G LTE-TDD configurations having 1 ms U, D and S subframes for each of 7 different configurations. The first configuration (i.e., "configuration 0") is further detailed in FIG. 3. The total length of the frame 300 is 10 ms, divided into 10 subframes 302, each having a length of 1 ms. It should be noted that throughout this disclosure, reference numbers having alphabetic suffixes (such as 302a and 302b) are referenced collectively by the numeric portion of the reference number (such as 302). It can be seen that the pattern of U, D and S subframes of the first five subframes repeats in the second five subframes. Accordingly, the frame 300 is said to have a downlink-to-uplink switch-point periodicity of 5 ms. Subframe 0 is a 1 ms downlink subframe 302a. Subframe 1 is a 1 ms long signaling subframe 302b. Subframe 2 is a 1 ms long uplink subframe 302c. Subframes 3 and 4 are additional 1 ms long uplink subframes 302d, 302e. These five subframes 302a through 302e have a total duration of 5 ms and make up one half of the 10 ms frame 300. The same sequence of U, D and S subframes is repeated by the subframes 302f through 32j in the second half of the frame 300.

FIG. 4 is an illustration of a frame according to configuration 5. In configuration 5 (shown in the table of FIG. 2), subframe 1 is a 1 ms long signaling subframe 402b. Subframe 2 is a 1 ms long uplink subframe 402c. Subframes 3 and 4 are additional 1 ms long uplink subframes 402d, 402e. These five subframes 402a through 402e have a total duration of 5 ms and make up one half of the 10 ms frame 400. However, unlike the frame 300 in FIG. 3 that conforms to configuration 0, the subframes 402g through 402j in the second half of frame 400 of FIG. 4 do not repeat the pattern of the first half of the frame 400. Rather, in the second half, all are downlink subframes. Thus, since the sequence of U, D and S subframes repeats every 10 ms, rather than every 5 ms (as is the case in configuration 0). Accordingly, configuration 5 is said to have a downlink-to-uplink switch-point periodicity of 10 ms.

In a typical network with many BS/APs and UEs, each node (BS/AP or UE) needs to be time synchronized and obey the specific time intervals laid out by the assigned configuration of U, D, and S subframes in order to operate properly. Because spectrum is a scarce resource, different network operators are sometimes allocated spectrum in channels that are adjacent to one another. Since they operate in adjacent channels there is the potential for disruptive interference from a first channel to an adjacent second channel. Such interference is characterized by a parameter referred to as "adjacent channel leakage ratio", resulting in "blocking" of the signals between the BS/AP and UE. The magnitude of the disruptive interference depends on the proximity of UE and BS/AP to each other and the magnitude of the power of the interfering signal with respect to the power of the signal with which that signal interferes.

Recently, the US Federal Government finalized rules for the use of an area of the frequency spectrum referred to as the Citizens Broadband Radio Service (CBRS). CBRS operates in a 150 MHz wide frequency range from 3.55 GHz to 3.7 GHz. Access to the spectrum is provided in three distinct tiers: (1) Incumbent users; (2) Priority Access License (PAL) users; and (3) General Authorized Access (GAA) users. Incumbent users are the highest tier and include military radar systems, satellite ground stations and wireless ISPs. These incumbent users are protected from possible interference from the other two lower tier users at all times.

PAL users are the next highest tier and have priority over and are protected from interference by GAA users. PAL licenses are assigned based on spectrum auctions. Each PAL license covers one 10 MHz channel for a single census tract for a predefined term. Census tracts are geographical areas defined on the basis of population statistics. The area boundaries of the census tracts are not expected to change much over time. For any given census tract, up to seven total PAL licenses may be assigned (i.e., seven 10 MHz channels per census tract, comprising 70 MHz within the 150 MHz CBRS band). There are over 70,000 such census tracts in the US. In some cases, a PAL frequency range may change over the course of the license based on activity by incumbent users.

GAA users are licensed-by-rule to permit open, flexible access to the band for a wide group of potential users. GAA users are guaranteed access to a minimum of 80 MHz and are permitted to use any portion of the 3.5 GHz band not assigned to a higher tier user. GAA users may also operate opportunistically on unused Priority Access channels.

The use of CBRS band, and in particular use by GAA users, raises the potential for interference between users of adjacent GAA channels. More particularly, in some cases a CBRS network may be established within a subspace of a larger public network.

FIG. 5 illustrates a Wide Area Network (WAN) operating on a first frequency channel f1 (e.g., a channel spanning a 10 MHz frequency range). The WAN network has a relatively large coverage area 504. A WAN BS/AP 502 operating in the WAN network communicates with UEs 505 within the coverage area 504 on the frequency channel f1.

A private network is located within the coverage area 504 of the WAN network and operates on a frequency channel f2 (i.e., a second channel spanning a 10 MHz frequency range adjacent the frequency channel f1). A private network BS/AP 506 operating in the private network has a coverage area 508 that is substantially smaller than the coverage area 504 of the WAN network 502. Both UEs 505*b* that are registered with the WAN network and UEs 510 that are registered with the private network may be found within the coverage area 508 of the private network. Because the frequencies channels f1 and f2 are adjacent, there is the potential for interference between the signals transmitted on frequency channel f1 and adjacent frequency channel f2. This is particularly true when the distance between the UE 505*b* and the BS/AP 502 is greater than the distance between the UE 510 and the BS/AP 506. That is, because the UE 505*b* may have to transmit over a greater distance, the transmit power with which the UE 505*b* transmits will be substantially greater than the transmit power with which the UE 510 transmits. If the two UEs 505*b*, 510 are close proximity to each other, there is the possibility that even though the UEs 505*b*, 510 are transmitting on different channels (i.e., different frequencies), the transmission from the UE 505*b* might impose significant interference with the ability of BS/AP 506 to clearly receive the transmission from the UE 510.

FIG. 6 illustrates several modes of interference, including interference from: (1) BS/AP 103 to BS/AP 603; (2) BS/AP 103 to UE 601; (3) UE 601 to BS/AP 103; (4) BS/AP 603 to UE 101; (5) UE 101 to BS/AP 603; and (6) UE 101 to UE 601.

One technique used to mitigate the interference is to have a communication link between the BS/AP 103 and the BS/AP 603 over which the two BS/APs can coordinate their transmissions to synchronize the TDD configuration that they each use so that both networks are transmitting UL signals at the same time and DL signals at the same time. However, this process is costly and requires tight coordination between different operators. Furthermore, it eliminates the flexibility of having operators that control different networks use different UL-DL configurations dynamically, where the selected TDD configuration depends on the data communication needs of each operator at the particular time of the transmission.

Accordingly, there is current a need for an efficient and effective method and apparatus to mitigate interference that might arise between networks operating on adjacent channels.

SUMMARY

Various embodiments of a communication system are disclosed in which cross channel interference is mitigated by having a network perform an RF environmental survey at the location of the relevant transmitters and receivers (i.e., UEs of BS/APs). Such surveys determine the nature of the RF environment (i.e., the potential that cross channel interference will be present). The results of the RF environmental survey are then used in one or more of the following ways to mitigate cross channel interference. For example, this RF environment survey can be done by a separate receiver implemented at the BS/AP that measures the RF signal at adjacent channels to its operation.

First, the results of the RF environmental survey are used to determine if cross channel interference is present. If so, the RF environmental survey information is further used to determine the Time Division Duplex (TDD) configuration of any potential source of cross channel interference. The information regarding the TDD configuration and timing of the potential cross channel interference source are used to synchronize the transmissions from the base stations/access points (BS/APs) and user equipment (UE) with the same TDD configuration of the potential source of cross channel interference. By detecting the TDD configuration independently, the need for coordination between different networks operating on adjacent frequency channels is eliminated.

Second, the disclosed method and apparatus uses adaptive guard bands that can be sized based on the results of the RF environment detected by the survey. Guard bands at the edge of the frequency channel can be made wider, narrower or eliminated depending upon the amount of potential cross channel interference. In addition, information regarding the amount of potential interference obtained during an RF environmental survey can be exchanged between networks or other BS/AP operating in relatively close physical proximity to each other. Such exchanges can occur on demand, in response to a request, or in response to a particular event.

Third, the disclosed method and apparatus allows decisions regarding channel assignment to be made based on the amount of adjacent interference and the desired performance. Accordingly, users or BS/APs that require lower error rates can be assigned those channels that are less impacted by potential interference as determined by information attained from the RF environmental survey. In some such embodiments, multiple sub-channels or specific frequency tones (e.g., PRBs in 4G LTE) within a particular frequency channel granted to a network can be defined and assignment of those sub-channels made based on the requirements of each subscriber (i.e., the users of particular UEs in the system). In cases in which a particular UE (or particular traffic flow) has requirements for lower error rates (e.g., higher Quality of Service (QoS)), sub-channels that are less likely to experience significant cross channel interference can be assigned. This can include identifying which particular physical resource blocks (PRBs) (i.e., the smallest defined frequency and time slot) to assign for downlink and uplink data transmission of each traffic flow as a function of actual or anticipated cross channel interference. In such cases, the RF environmental survey provides information regarding interference on a PRB basis.

Fourth, a first network operating in accordance with the disclosed method and apparatus can direct a UE of a second network operating on an adjacent frequency channel to another frequency channel in order to minimize the interference by the second network on the uplink of the first network. In some embodiments, the first network can "coax" the UE of the second network into reselecting a non-adjacent channel by biasing the UE to another frequency channel, such as by any one or more of the following: (1) altering the Cell Individual Offset (CIO) of a cell on the non-adjacent channel, (2) requesting the other network to move the interfering UE to a non-adjacent channel via forced handovers, (3) facilitating the UE to roam into the private network to allow the UE to access a channel that causes less interference (i.e., provided handover from the second network to the first network), (4) increasing the downlink transmit power of the first network to trigger the UE of the second network to start an inter-frequency handoff to another channel, and (5) placing a power cap on the UE so that the Uplink transmit power would not cause outgoing interference to exceed a threshold. This can be done via closed-loop power control.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIG. 2 shows a table of TDD configurations having 1 ms U, D and S subframes for each of 7 different configurations.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Overview

Figure 1:
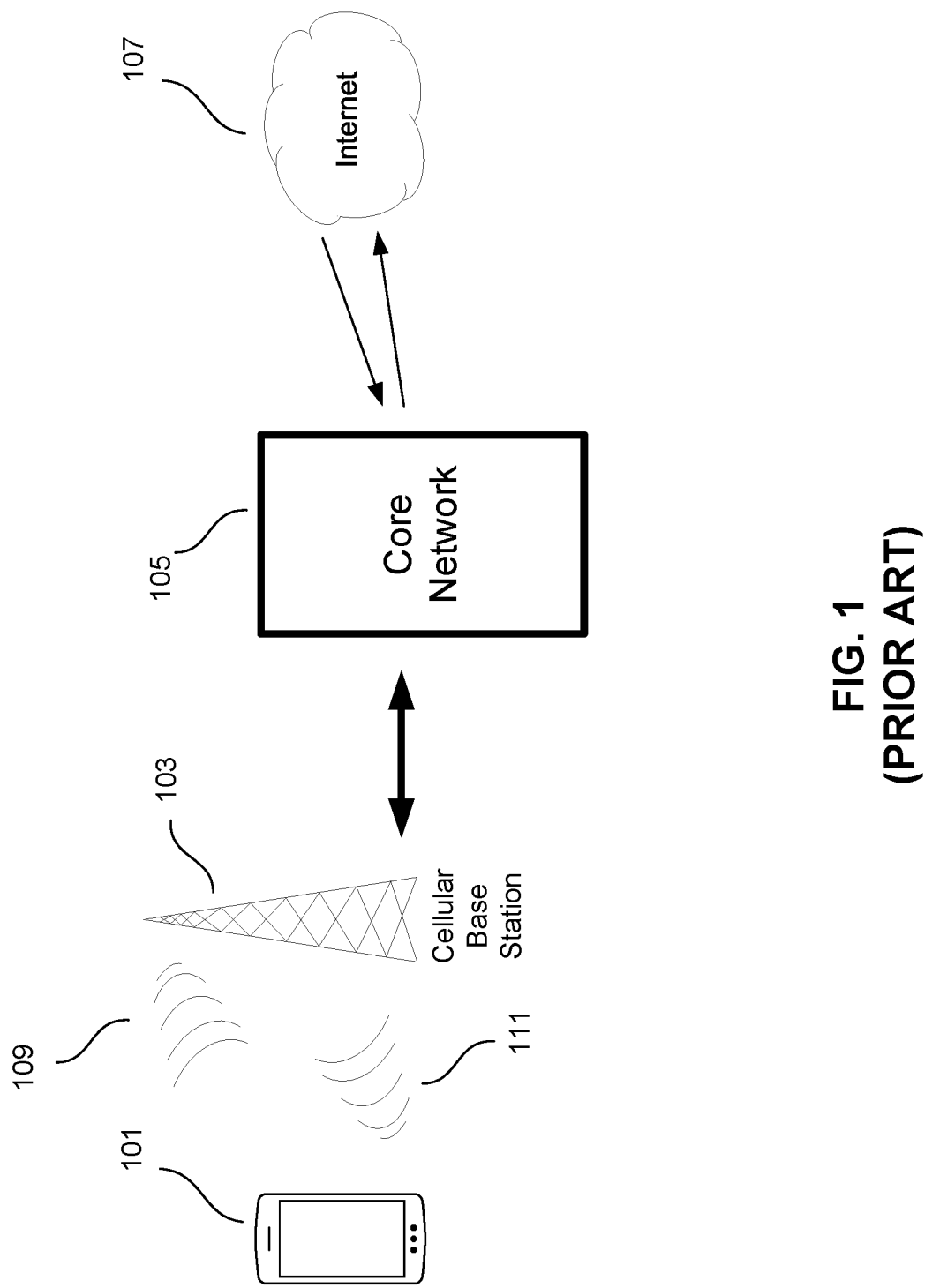
FIG. 1 is an illustration of a basic configuration for a communication network, such as a "4G LTE" (fourth generation Long-Term Evolution) or "5G NR" (fifth generation New Radio) network, in which user equipment (UE) communicates with a base station/access point.
Figure 3:
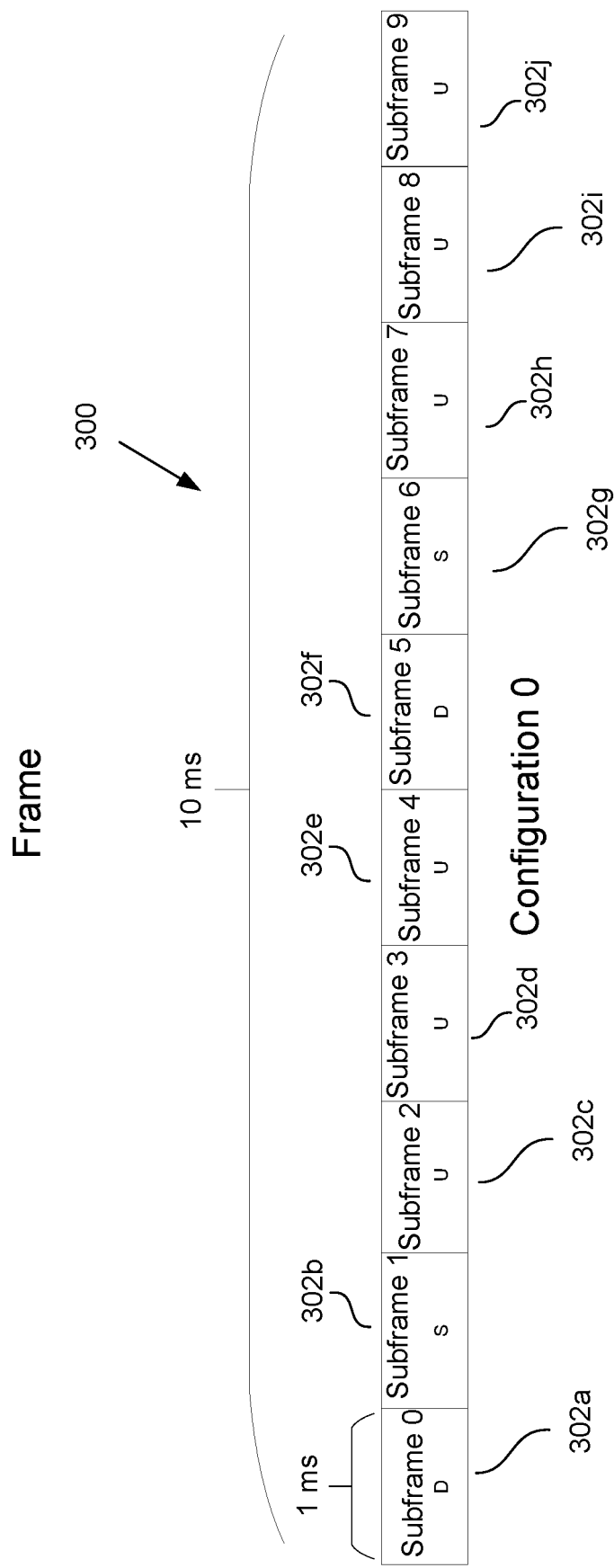
FIG. 3 provides details regarding the first configuration (i.e., "configuration 0") shown in FIG. 2.
Figure 4:
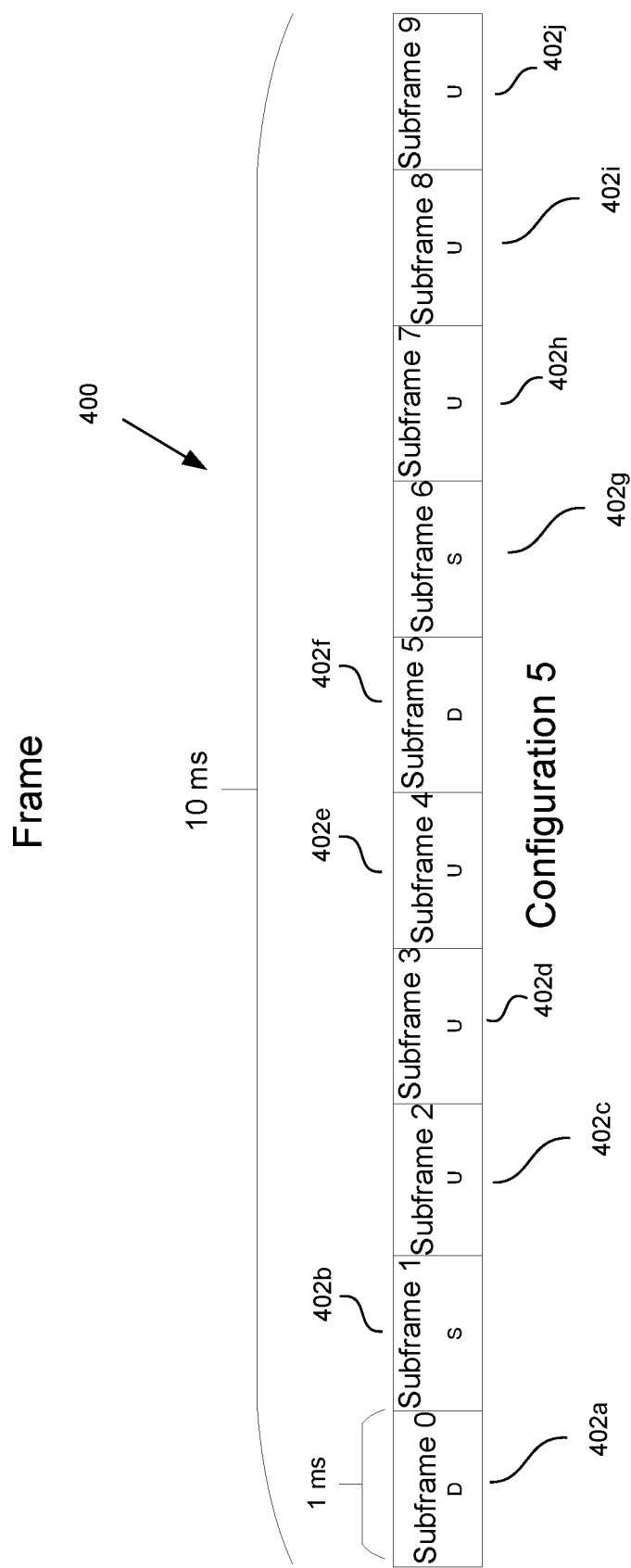
FIG. 4 is an illustration of a frame according to TDD configuration 5.
Figure 5:
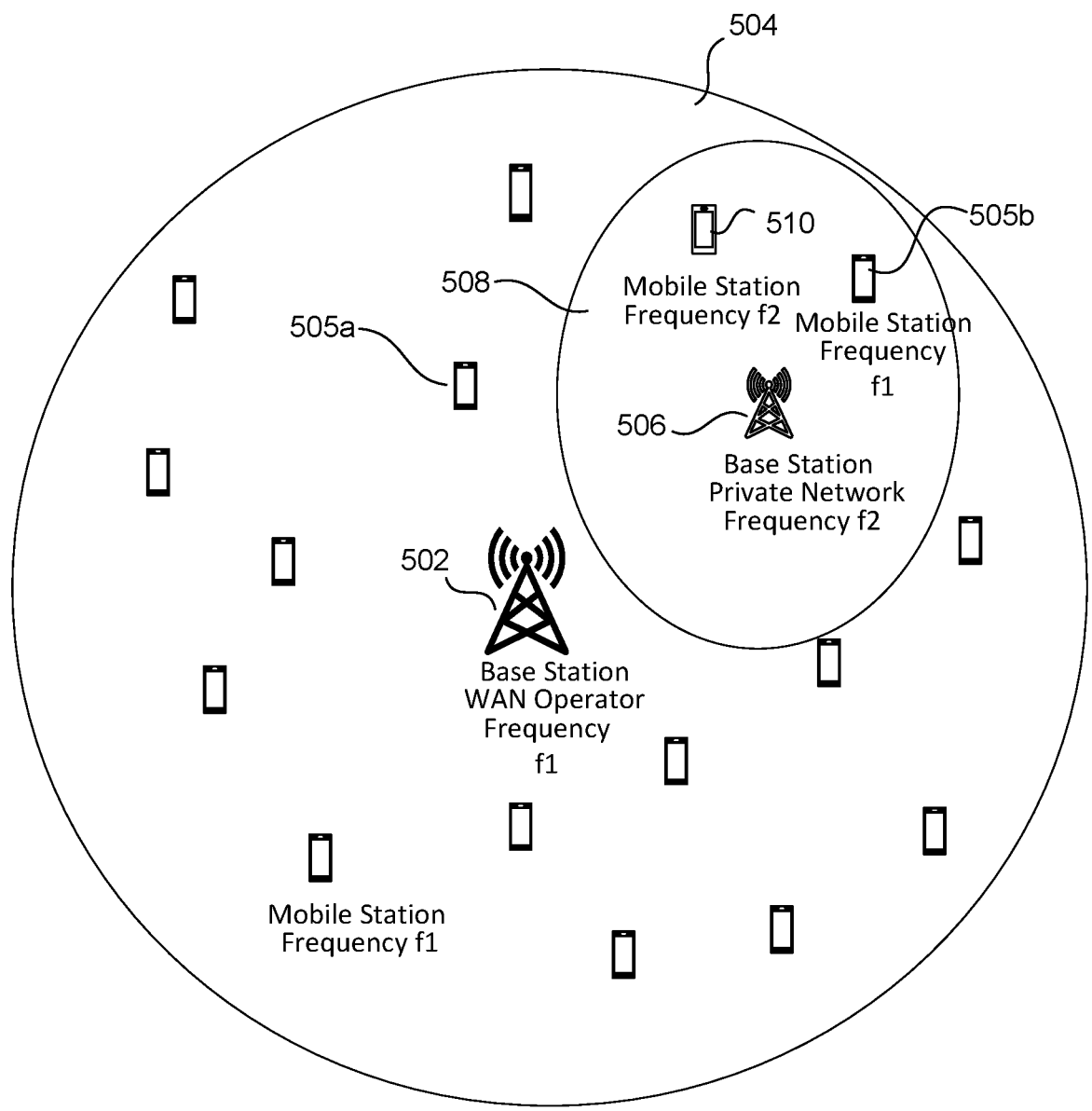
FIG. 5 illustrates a Wide Area Network (WAN) operating on a first frequency channel f1.
Figure 6:
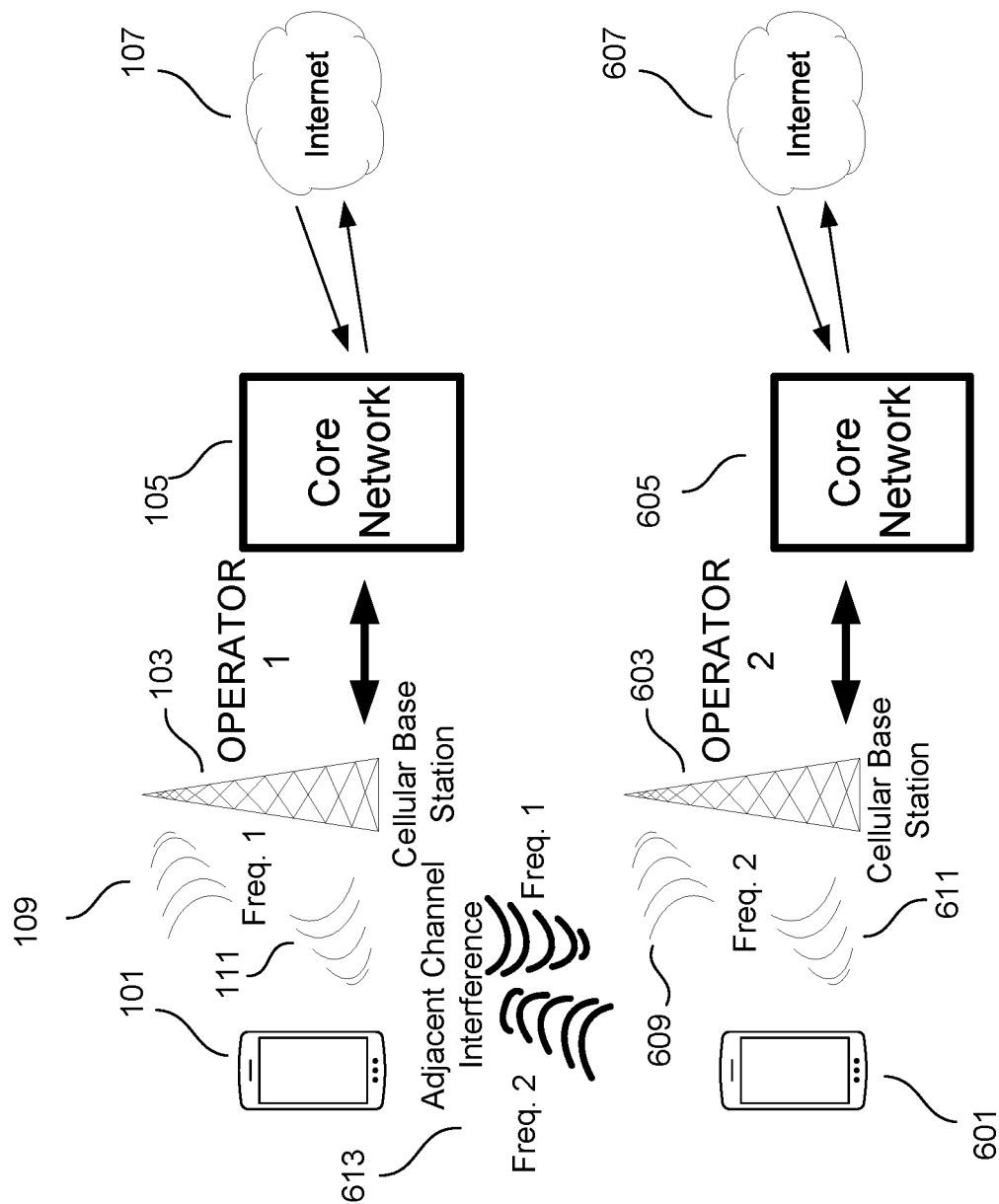
FIG. 6 illustrates several modes of interference.
Figure 7:
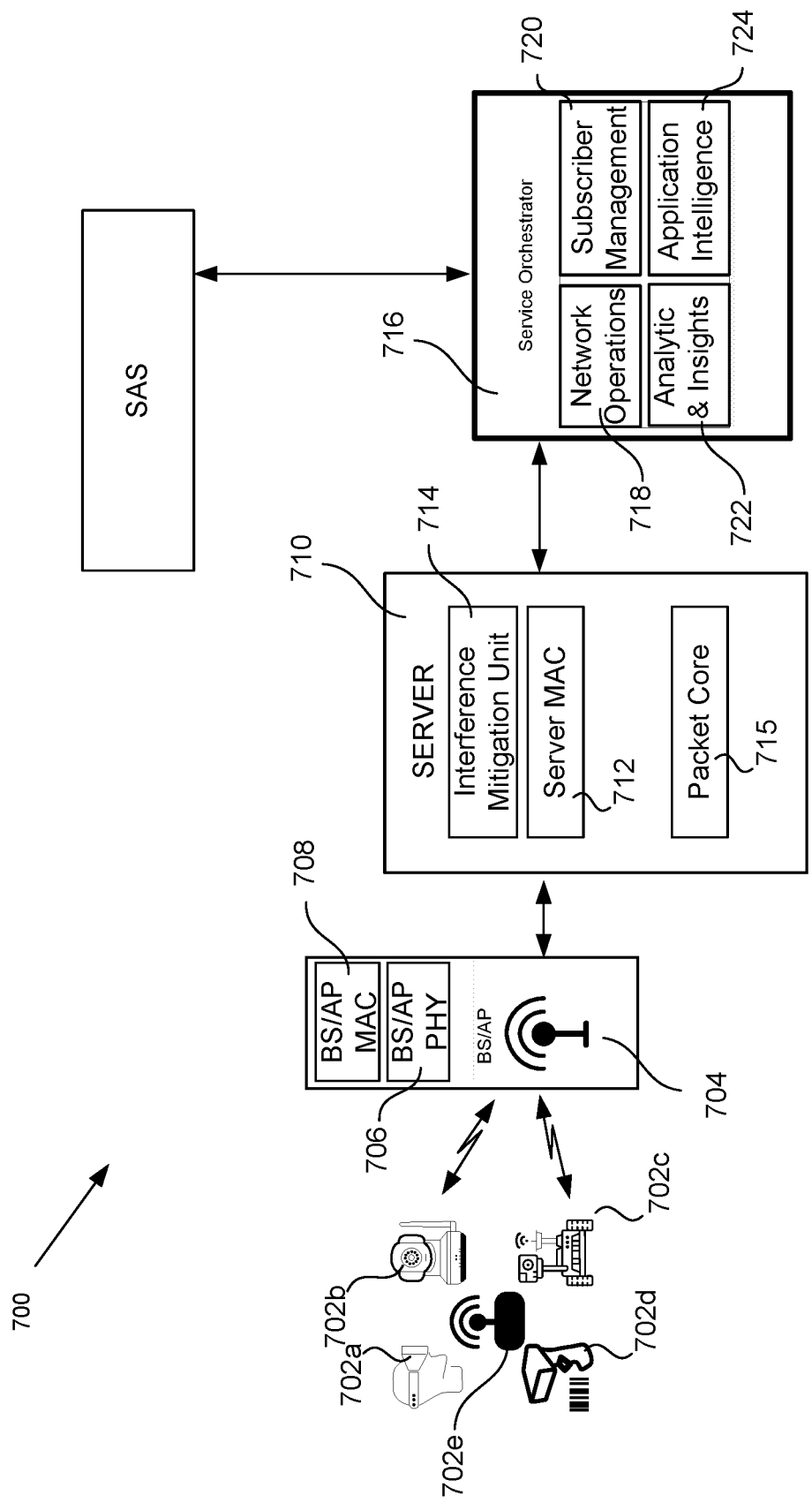
FIG. 7 is an illustration of the system in which the disclosed method and apparatus resides.

FIG. 7 is an illustration of the system 700 in which the disclosed method and apparatus resides. In one embodiment, the system 700 is an enterprise network (i.e., a private communications network). Authorized devices, hereafter referred to as user equipment (UEs) 702 can connect wirelessly to an access point or base station (BS/AP) 704 of the enterprise network implemented by the system 700. In some embodiments, UEs 702 include wireless communications enabled devices, such as virtual reality googles 702a, robotic UEs 702b, autonomous driving machines 702c, smart barcode scanners 702d, and communications equipment 702e, which includes cell phones, computers and other types of personal communications devices. It will therefore be understood that the term UE as used herein is a broad term intended to cover any communications enabled device that can connect wirelessly to the BS/AP 704. In some embodiments, the BS/AP 704 is an eNodeB of an LTE/5G network, a Citizens Broadband Radio Service Device (CBSD) of a Citizens Broadband Radio Service (CBRS), access node of a local area network (LAN) or Wide Area Network (WAN), etc. It should be understood that these are just some the very large number of communication components that might be serviced/used in the private network implemented by the system 700.

Each of the UEs 702 has a transceiver that allows the device to communicate wirelessly with the BS/AP 704. Details of the transceivers of the UEs 702 are provided further below. The BS/AP 704 allows such communication to be extended to resources either within the private network implemented by the system 700 or with resources that are available in other networks, such as the internet, for example, through a gateway (not shown).

In some embodiments, the BS/AP 704 is a CBSD within a CBRS. In other embodiments, the BS/AP 704 is an access point, access node, eNodeB or base station operating at a frequency and in conformance with a protocol other than that of the CBRS. Accordingly, the BS/AP 704 may be a base station or central wireless communication hub within any wireless communication system. For the sake of discussing the disclosed method and apparatus generally, the term BS/AP is used for all such communication nodes. In any case, in some embodiments, the BS/AP generally has a physical layer module ("PHY") 706 and a Medium Access Control sub-layer module ("BS/AP MAC 708"). The PHY 706 performs functions associated with the PHY layer of the conventional 7-layer Open Systems Interconnect (OSI) model. The MAC 708 performs functions associated with the MAC sub-layer of a data link layer ("DLL") of the OSI model.

In such embodiments, the PHY 706 is generally responsible for generating a transmission signal, propagating the signal and for receiving signals. Accordingly, components such as the amplifiers and filters are provided in the PHY 706. The MAC 708 is generally responsible for receiving content received by the PHY and controlling the physical hardware of the PHY 706. In particular, the MAC 708 determines the assignments of channels, the general organization of the signals to be transmitted, etc. In some cases, the MAC 706 may receive indications as to which channel to assign for transmission of particular packet of content. However, the MAC determines the particular frequency used to transmit on that channel. It should be understood that this particular configuration is merely one example and the particular details of the organization of the radio within each of the components of the disclosed communication network are not of particular relevance to the disclosed method and apparatus, but are provided here merely as examples of one manner in which the system may be organized to assist in understanding one particular context in which the disclosed method and apparatus may be used. In addition, the designations and logical organization of functions within the radios of the components of the communications system can vary significantly without departing from nature of the disclosed method and apparatus.

A server 710 (which may also be referred to as an "edge compute platform") is coupled to the BS/AP 704 over a separate connection from the wireless connection used for communication between the BS/AP 704 and the UEs 702. In some embodiments, the server 710 is coupled by a hardwire connection to the BS/AP, such as by a proprietary interface or over a standard interface, such as TR-069 on coaxial cable, ethernet cable, etc. In some embodiments, the BS/AP 704 is mounted on the ceiling within a facility, such as a room within an office building or a factory floor within a manufacturing facility. However, the particular environment in which the private network implemented by the system 700 is installed is not of particular relevance to the disclosed method and apparatus, but is provided merely as context to facilitate an understanding of the disclosed method and apparatus.

In some embodiments, MAC functionality can be distributed between the BS/AP MAC 708 and a server MAC 712 that resides within the server 710. In other embodiments, all of the MAC functionality may be implemented by the server 710. In some embodiments, an Interference Mitigation Unit (IMU) 714 comprising a processor (not shown) resides within the server 710. The IMU 714 performs functions (described in greater detail below) that lie outside the scope of the conventional functions preformed by a conventional MAC and PHY. In some embodiments, the server 710 further comprises a Packet Core Unit (PCU) 715. In some such embodiments, the PCU 715 performs functions similar to those performed by an Evolved Packet Core (EPC) of a 4G LTE network or a 5G Core (5GC) of a 5G network.

In some embodiments, a Service Orchestrator (SO) 716 provides additional functionality. In some such embodiments, the SO 716 comprises one or more of the following units: (1) a Network Operations Unit 718; (2) a Subscriber Management Unit 720; (3) an Analytics & Insights Unit 722; and (4) an Application Intelligence Unit 724.

RF Environment Survey

The system 700 has the ability to perform an RF survey of the radio frequency (RF) environment in which the system 700 is operating. That is, in accordance with some embodiments of the disclosed method and apparatus, the Network Operations Unit 718 within the server 710 comprises a processor (not shown) configured to request that each of the BS/APs 704 and each UE 702 registered with the private network implemented by the system 700 listen through their respective antennas (not shown) to detect signals that are within the operating frequency range of the system 700 or that are sufficiently close to the operating frequency of the system 700 that such signal might pose a threat of interfering with communications between any of the UEs 702 and any BS/AP 704. In particular, this includes the frequencies that are immediately adjacent to the frequencies over which the devices and BS/APs 704 communicate with one another. In some such embodiments, the Network Operations Unit 718, in coordination with the IMU 714, can initiate a process by which the BS/APs 704 and UEs 702 each listen on the frequencies of interest and report back the power levels of signals that are detected at those frequencies.

In some embodiments in which the system 700 conforms to CBRS standard, during registration of the BS/APs 704 (i.e., CBSDs in this example), the registration request can be made to an Spectrum Access System (SAS) 726 that indicates that the BS/APs 704 does not require any inter-group, inter-CBSD interference coordination. In some such embodiments, the Network Operations Unit 718 controls the process by which the RF environment is surveyed. In other embodiments, the IMU 714 controls the process. Alternatively, the BS/AP 704 can register with the SAS 726 in a manner that allows the SAS 726 to coordinate the gathering of information regarding the RF environment and providing that information to the IMU 714 within the server 710. In any case, in some embodiments the Analysis & Insights unit 722 within the SO 716 performs analysis and provides insights into the operation of the private network implemented by the system 700 based on the information received by the IMU 714 from the server 710, the SAS 726 or both and shared with the SO 716. Such analysis and insights can include determining the level of interference present in the RF environment, the likelihood that such interference will impede communications, the level of impediment that might be expected, etc. In some such embodiments, reports regarding one or more of these factors would be available to service personnel responsible for the oversight and/or maintenance of the private network implemented by the system 700. In some embodiments, such reports are provided through a database maintained in a cloud server to which the SO 716 has access or through a terminal at a facility in which the server 710 resides.

Figure 8:
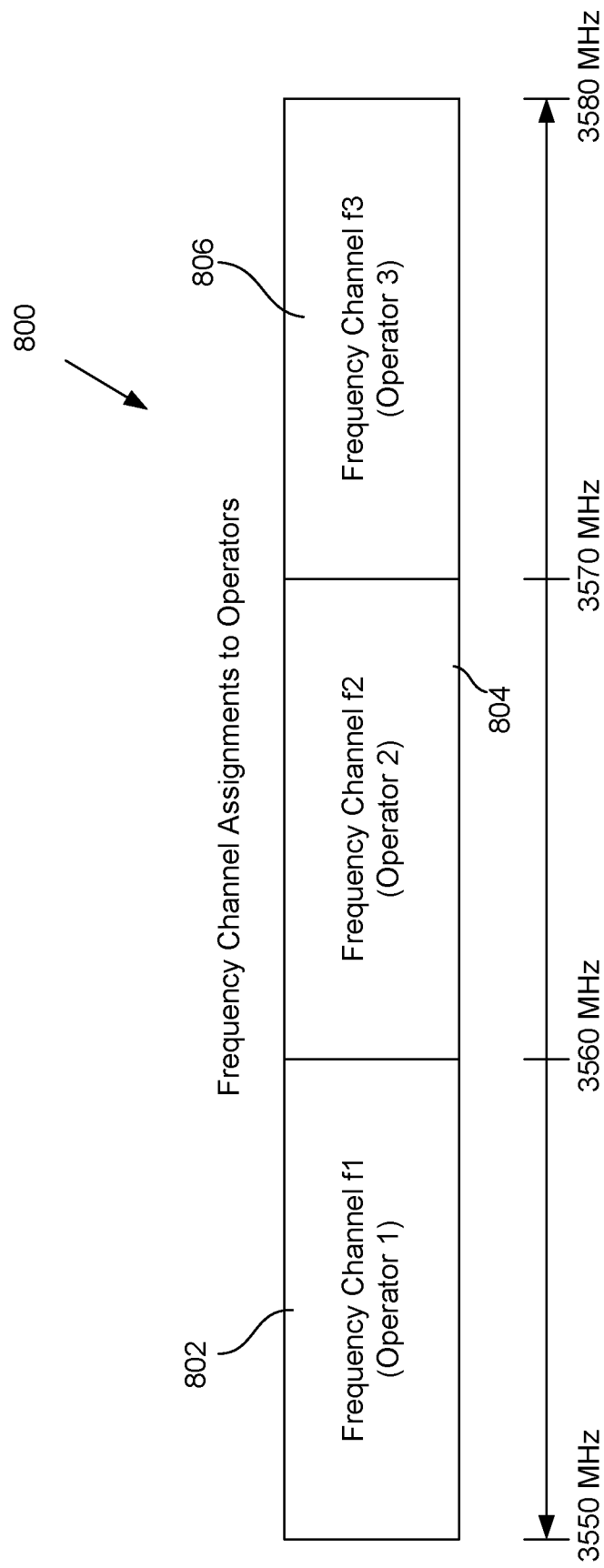
FIG. 8 is an illustration of a section of the frequency spectrum that has been designated for use by three different operators, each operating a CBRS system.

FIG. 8 is an illustration of a section of the frequency spectrum 800 that has been designated for use by three different operators, each operating a CBRS system. The CBRS frequency range is provided as an example of a frequency range within which a system 700 might operate in accordance with the currently disclosed method and apparatus. Three 10 MHz wide frequency channels 802, 804, 806 within the CBRS frequency band are shown as being assigned to three different operators. In one example, the first channel 802 is granted for use under a Priority Access License (PAL) to an operator operating a Wide Area Network (WAN) in the frequency range from 3550 MHz to 3560 MHz. The second channel 804 is assigned for use by the operator operating the private network implemented by the system 700 as a General Authorized Access (GAA) user in the frequency range from 3560 MHz to 3570 MHz. The third channel 806 may be assigned to a third operator under a PAL for use of the frequency range from 3570 MHz to 3580 MHz.

Figure 9:
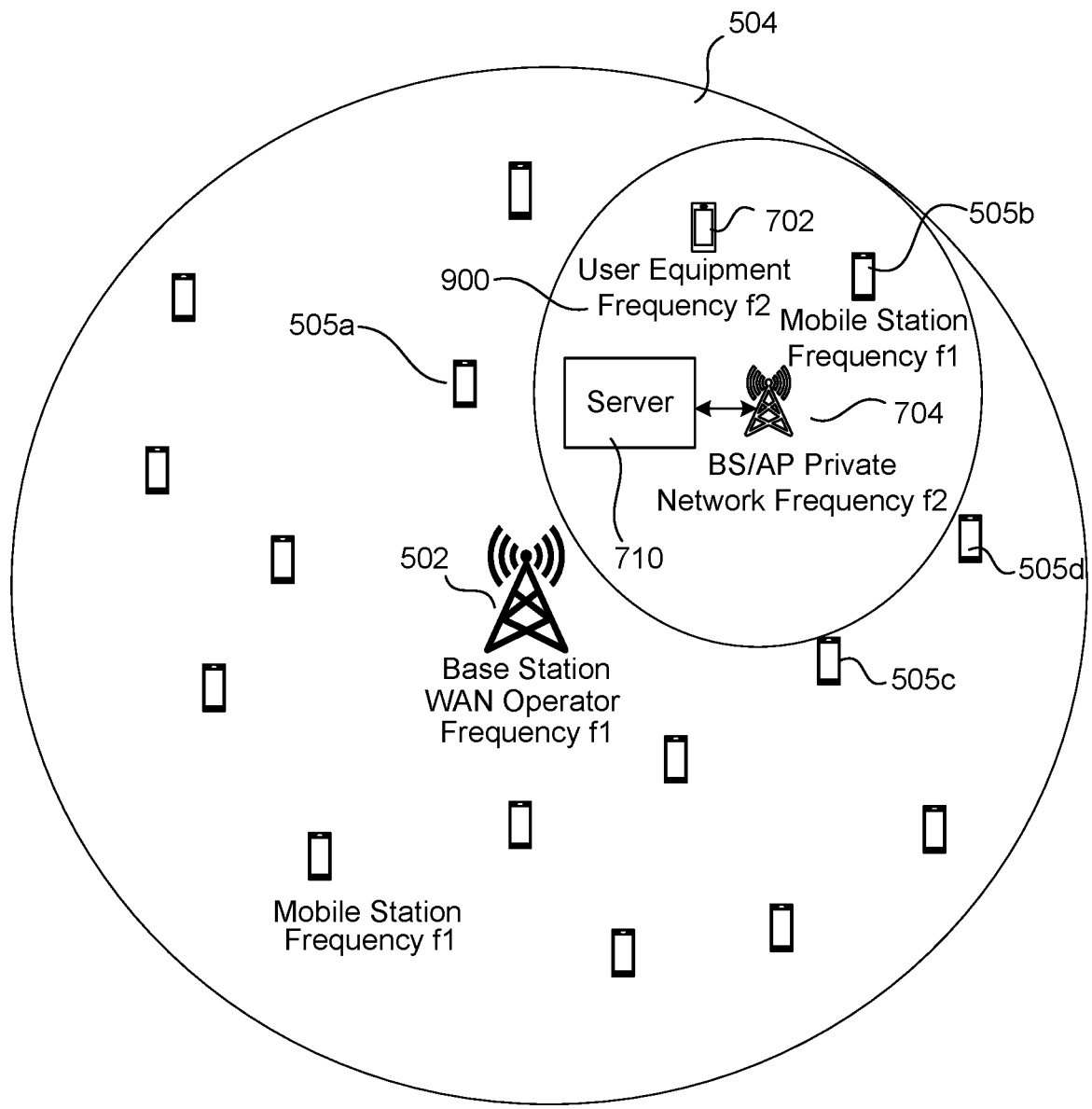
FIG. 9 is an illustration of the coverage areas of the WAN network operated and the coverage area of the BS/AP of a private network.

FIG. 9 is an illustration of the coverage areas 504 of the WAN network operated under the PAL by the first operator and the coverage area 900 of the BS/AP 704 of the private network implemented by the system 700. The WAN has a WAN BS/AP 502 having a coverage area 504 within his network. In addition, several UE devices 505, such as mobile devices that may include mobile cellular phones, laptop computers, etc. are present in the WAN coverage area 504. The private network BS/AP 506 has a coverage area 900 that is completely within the coverage area 504 of the WAN base station 502 operated by the first PAL operator.

Due to the relatively close proximity of the device 505b to the BS/AP 704 and the UE 702, transmissions from the device 505b will be detected through antennas of the BS/AP 704 and UE 702 when the server 710 begins to perform an RF survey. The power of the transmissions, particularly within the frequency f2 used by the private network implemented by the system 700 will be provided to the IMU 714.

Figure 10:
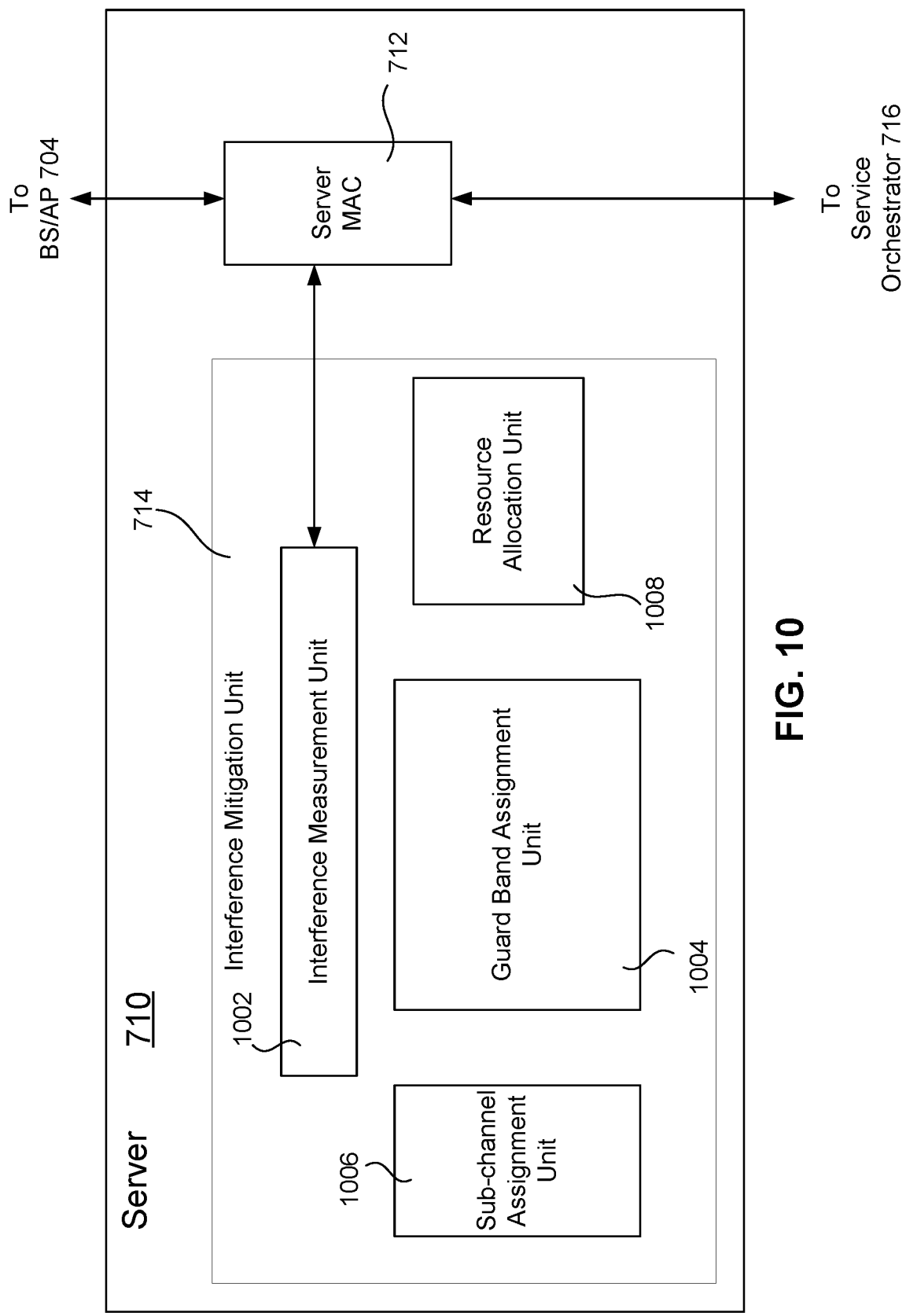
FIG. 10 is a more detailed block diagram of a server in accordance with some embodiments of the disclosed method and apparatus.

FIG. 10 is a more detailed block diagram of the server 710. In some embodiments, the IMU 714 has an Interference Measurement Unit 1002, a Guard Band Assignment Unit 1004, a Sub-channel Assignment Unit 1006 and a Resource Allocation Unit 1008. In some such embodiments, the Interference Measurement Unit 1002 controls the RF survey process described above. In some such embodiments, the Interference Measurement Unit 1002 communicates control information to the server MAC 712 (see FIG. 7). In some embodiments, the control information is communicated from the server 710 to one or more of the BS/APs 704 over a proprietary interface or over a standard interface, such as TR-069. The information instructs the server MAC 712. In some embodiments, those instructions are received and interpreted by the BS/AP MAC 708 in one or more of the BS/APs 704 associated with the server 710. The BS/AP MAC 708 in turn controls the BS/AP PHY 706 to receive in-band signals (i.e., channel f2). The BS/AP PHY 706 receives the signals as instructed, makes measurements of the received signals (i.e., comparing the detected received signal strength indicator/reference signal received power (RSSI/RSRP) to a certain threshold) and provides those measurements back to the BS/AP MAC 708. In addition, in some embodiments, measurements are made on granular chunks of the adjacent frequency channels f1, f3 (i.e., specified frequencies at predetermined times) to determine which subbands in the frequency channel f1, f3 exceed a measurement threshold. The BS/AP MAC 708 returns the measurements back to the server MAC 712. In some embodiments, the server MAC 712 is responsible for interpreting the measurements. For example, in some embodiments, the server MAC 712 determines a signal to Interference plus Noise Ratio (SINR) from measurements of the received power, etc. and determining whether the SINR exceeds a predetermined threshold). In some embodiments, the threshold is a function of the downlink transmit power of the Private Network BS/AP 704. In other embodiments, the BS/AP MAC 708 interprets the measurements prior to sending the information to the server MAC 712.

In addition, control signals are sent through the BS/AP 704 to one or more of the UEs 702 that are in wireless communication with the BS/AP 704 to instruct those UEs 702 that are capable, to make similar measurements as part of the RF survey. The resulting measurements are then communicated back through the wireless connection to the BS/AP 704 and then on to the server 710.

Synchronization of TDD Configuration

In some embodiments, information attained by the RF survey is used to determine whether, in the particular RF environment in which the system 700 is operating, there is potential interference that could be mitigated by synchronizing the Time Division Duplex (TDD) configuration of the private network implemented by the system 700 with the TDD configuration of other networks transmitting in the RF environment. FIG. 2, discussed above, shows an example of a table of TDD configurations that might be used by a network that operates on frequency channel f1, while the private network implemented by the system 700 operates on the adjacent frequency channel f2. In some embodiments, in addition to determining the amount of power that can be received by particular BS/APs 704 and UEs 702 within the private network, the Interference Measurement Unit 1002 within the IMU 714 determines the particular TDD configuration that is being used by the BS/APs 502 and UEs 505 of the WAN network operating on the adjacent frequency channel f1. Upon determining the TDD configuration, the IMU 714 provides the information to the Network Operations Unit 718. In some such embodiments, the Network Operations Unit 718 then provides instructions to the server MAC 712 to cause the transmissions from each of the BS/APs 704 within the private network to synchronize with the timing of the TDD configuration with which the WAN BS/APs 502 are aligned. Detecting the TDD configuration by means of the RF survey and determining whether there is interference that might be favorably addressed by synchronizing the TDD configuration of the private network with that of a network operating on an adjacent frequency channel, eliminates the need for the private network to directly communicate with the network operating on the adjacent frequency channel and frees the private network to make a determination as to whether to restrict communications to conform with the TDD configuration of the neighboring networks.

Figure 11:
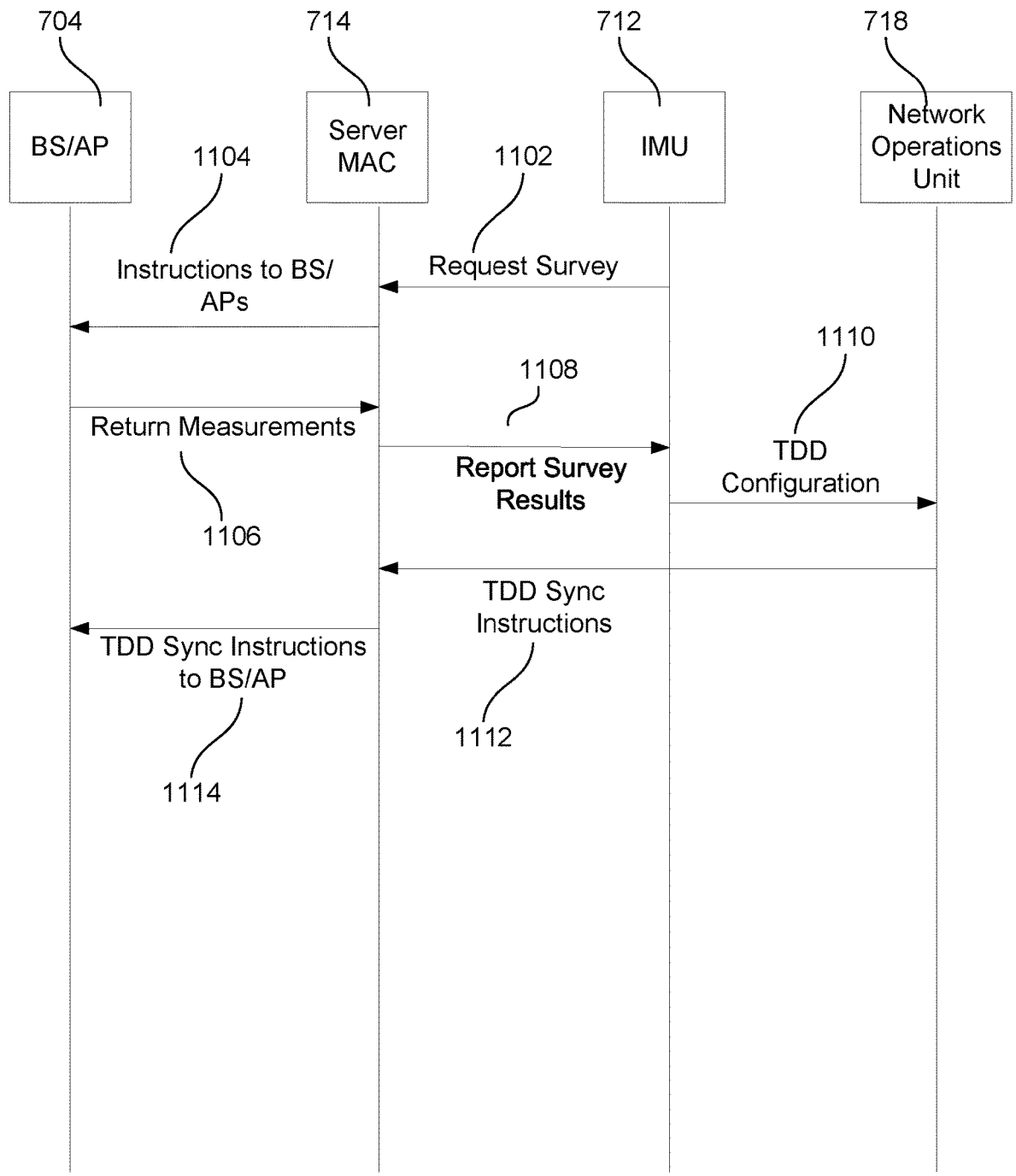
FIG. 11 is an illustration of the message flow that occurs in some embodiments of the disclosed method and apparatus to implement the TDD configuration synchronization.

FIG. 11 is an illustration of the message flow that occurs in some embodiments of the disclosed method and apparatus to implement the TDD configuration synchronization. Initially, the IMU 712 provides instructions 1102 to the server MAC 714 within the server 710 to request an RF environmental survey. However, in some embodiments, the IMU 712 transmits the request directly to a recipient, such as a BS/AP 704. The server MAC 714 in turn generates the necessary instructions 1104 to each of the BS/APs 704 to listen to the RF environment and report back measurements of the environment. Each of the BS/APs 704 returns the measurement 1106 made in response to the instructions 1104. In some embodiments, the server MAC 714 prepares a report 1108 based on the measurements 1106 reported from the BS/APs 704. In other embodiments, the measurements received by the server MAC 714 are sent to the IMU 712. In still other embodiments, the measurements are received directly by the IMU 712 from the BS/APs 704. In those embodiments in which the IMU 712 receives the measurements, the IMU 712 prepares the report from the measurements. In either case, the IMU 712 determines whether there are any sources of cross channel interference and if so, whether it would improve the interference to synchronize the TDD configuration of one or more of the BS/APs 704. If so, the IMU 712 provides the TDD configuration 1110 to the Network Operations Unit 718. The Network Operations Unit 718 formulates and communicates instructions 1112 to the server MAC 714. The server MAC 714 in turn sends instructions 1114 to the BS/APs 704 to operate in synchronicity with the TDD configuration.

Adaptable Spectrum Guard Band

In some embodiments, a Guard Band Assignment Unit 1004 within the IMU 714 can provide control signals to the BS/AP PHY 706 within one or more of the BS/APs 704 within the private network implemented by the system 700 to reduce the bandwidth within which content is modulated on the channel f2 to provide a spectrum guard band on each side of the channel f2 frequency range.

Figure 12:
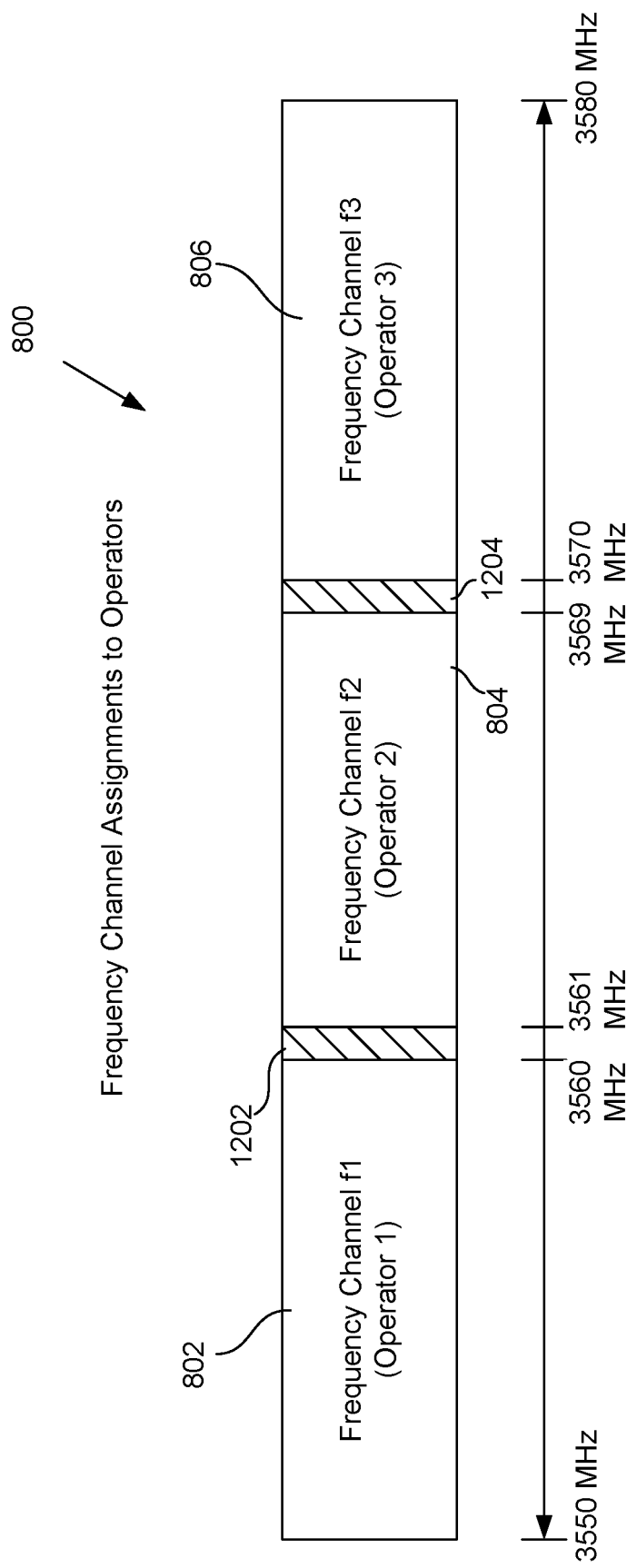
FIG. 12 is an illustration of spectrum guard bands.

FIG. 12 is an illustration of spectrum guard bands 1202, 1204. The spectrum guard bands are adaptive. That is, the frequency width of each guard band 1202, 1204 will be determined by the Guard Band Assignment Unit 1004 based on the amount of potential interference that is likely in view of the amount of power that was received by the BS/AP 704 and UE 702. Accordingly, in some embodiments of the disclosed method and apparatus, the Guard Band Assignment Unit 1004 determines the amount of spectrum guard band that needs to be used by the private network to provide adequate protection against the WAN network based on the adjacent channel measurements made by the BS/AP 704 and UE 702. The Guard Band Assignment Unit 1004 uses the information regarding the RF environment to determine the how large the spectrum guard band should be (i.e., the frequency range within which no content will be modulated for transmission between the BS/APs 704 and the UEs 702). In the example shown in FIG. 12, the guard bands 1202, 1204 are each 1 MHz wide. It should be noted that the two guard bands 1202, 1204 at each end of the frequency range 804 need not be the same width.

In addition to the amount of power measured by the BS/AP 704 and UE 702, some of the factors that may either alternatively, or in addition, be taken into consideration, are packet error rates for content that is communicated between the BS/AP 704 and UE 702 and SINR measured at the BS/AP 704 and UE 702, radio link failures, average Hybrid Automatic Repeat Request/Automatic Repeat Requests (HARQ/ARQ) retransmission count, etc. Other quality of reception metrics may also be used to assist in determining the desired width of the spectrum guard bands 1202, 1204. It will be understood by those skilled in the art that the guard bands 1202, 1204 are generated by controlling the width of filters within the receiver and transmitters in the BS/AP 704 and UE 702, as well as by controlling the oscillators within the modulators used to modulate content upon the carriers used to transmit from the BS/AP 704 and UE 702.

In some embodiments, control signals are sent to the UEs 702 on the wireless connection from the BS/AP 704 to indicate to the UEs 702 the size of the spectrum guard bands. Alternatively, the transmitters and receivers within the UEs 702 remain unchanged and only the transmitters within the BS/AP 704 transmit signals with the guard bands 1202, 1204.

In some embodiments, in addition to information gathered by the BS/AP 704 and UEs 702, the BS/AP 704 and the WAN BS/AP 502 periodically exchange interference power measured by their respective PHYs and the UEs 702, 505b 505c, 502d, an in some embodiments, particularly those devices at the edges of the common coverage areas (i.e., the edge of the BS/AP cover area 900). In some embodiments, particular significance is afforded to the amount of interference power measured at the edges of the frequency channels f1, f2. In some embodiments, the information exchange between the private network BS/AP 704 and the WAN BS/AP 502 occurs over a standard interface, such as X2. Alternatively, the exchange can be facilitated by private network BS/AP 704 using a proprietary interface and protocol. In some embodiments, the exchange is facilitated by adding "proprietary vendor extensions" to the standard X2 protocol. In some embodiments, the exchange occurs in response to a request (i.e., on demand). Alternatively, the exchange occurs in response to a triggering event, such as the interference power exceeding a threshold. In some embodiments, the threshold is set based on quality of service metrics, including the amount of interference power that is tolerable based on SINR, packet error rate, radio link failures, average Hybrid Automatic Repeat Request/Automatic Repeat Requests (HARQ/ARQ) retransmission count or other such performance metrics measured at the BS/AP 704 or UE 702.

Figure 13:
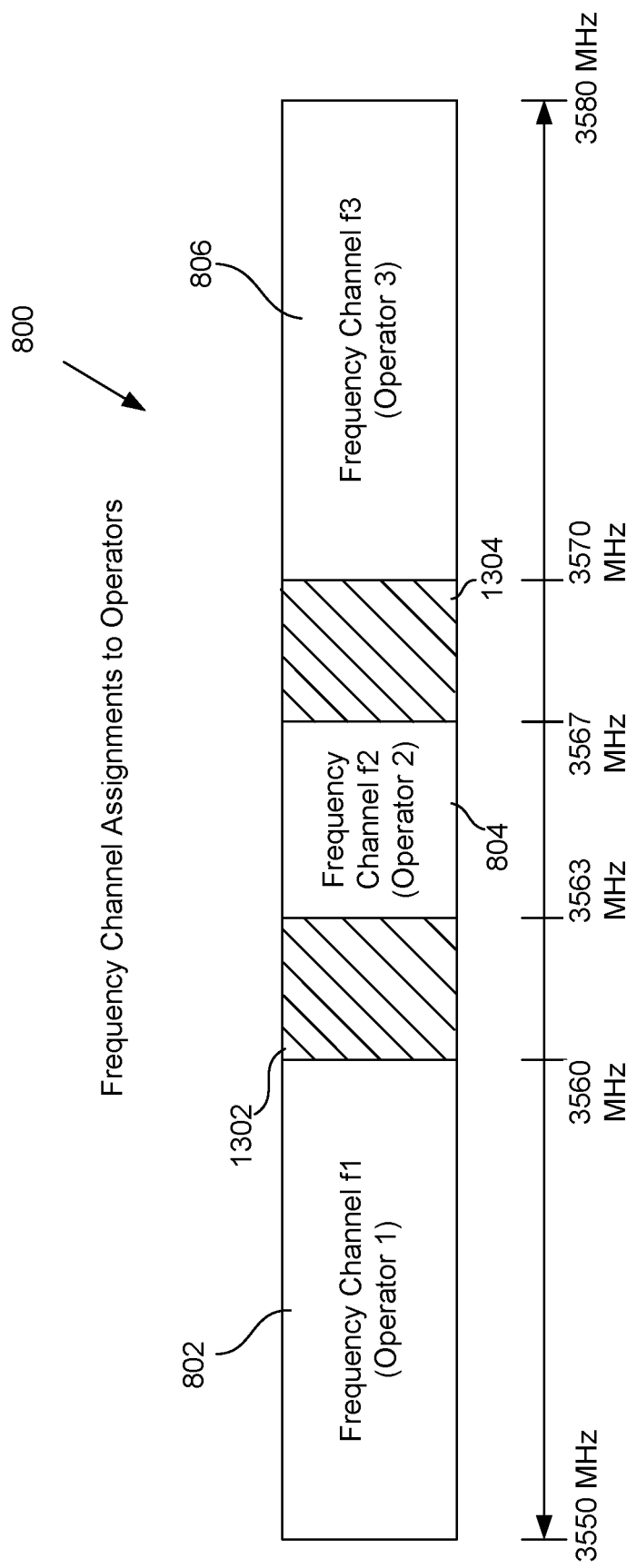
FIG. 13 is an illustration of the frequency channel assignments with each spectrum guard band expanded to be 3 MHz wide.

FIG. 13 is an illustration of the frequency channel assignments with each spectrum guard band 1302, 1304 expanded to be 3 MHz wide based on criteria set in the Guard Band Assignment Unit 1004 within the IMU 714.

Figure 14:
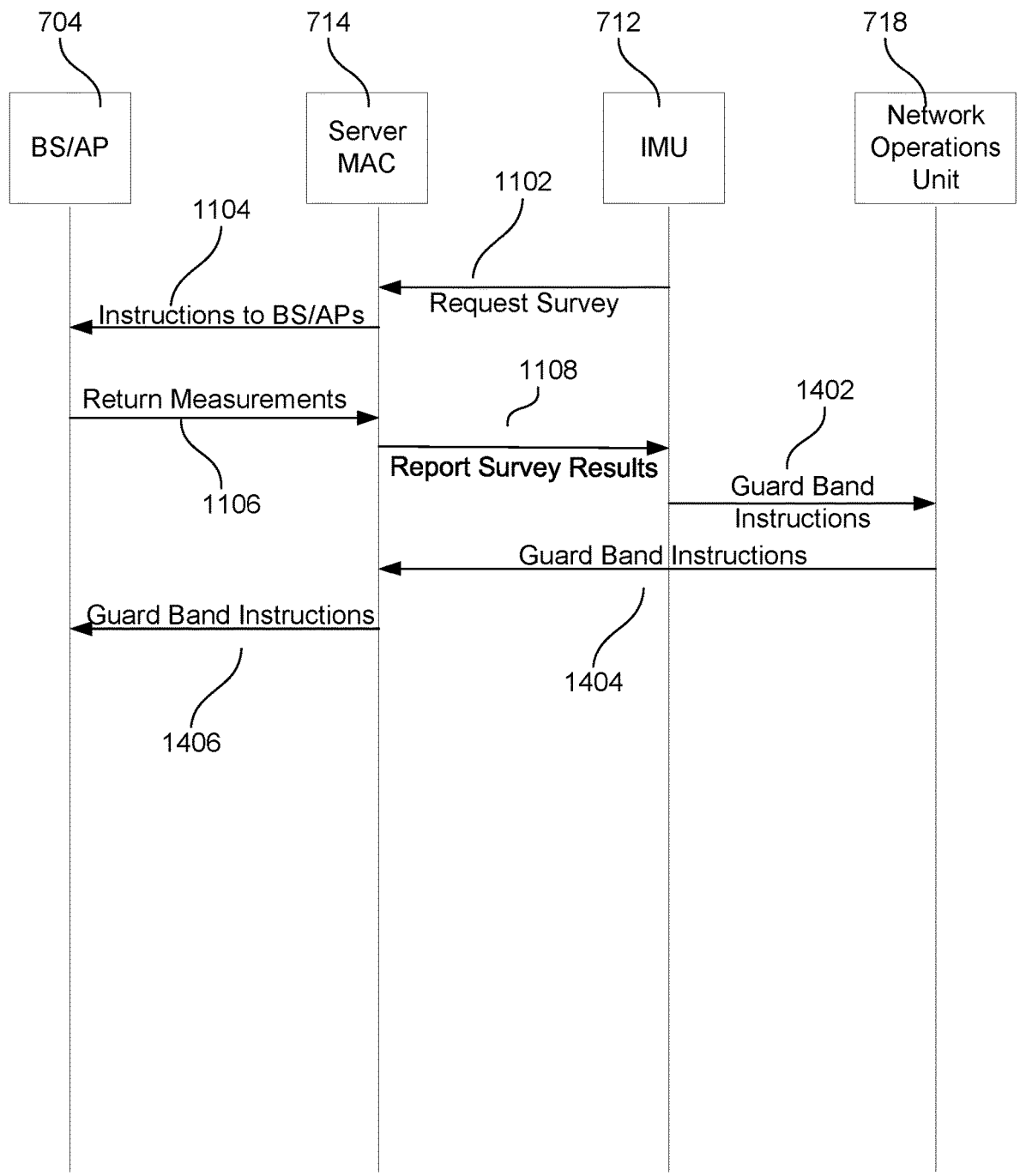
FIG. 14 is an illustration of the message flow that occurs in some embodiments of the disclosed method and apparatus to implement the adaptive Guard Band.

FIG. 14 is an illustration of the message flow that occurs in some embodiments of the disclosed method and apparatus to implement the adaptive Guard Band. Initially, message flow for the portion of the flow related attaining an RF environmental survey is the same as shown in FIG. 11 and described above. Once the survey results are reported 1108, the IMU 712 determines whether there are any sources of cross channel interference and if so, whether it would improve if communications between the BS/AP 704 and the UEs 702. If so, the IMU 712 provides the guard band instructions 1402 to the Network Operations Unit 718. The Network Operations Unit 718 formulates and communicates instructions 1404 to the server MAC 714. The server MAC 714 in turn sends instructions 1406 to the BS/APs 704 to operate with the guard bands.

Selection of Sub-Channels

The particular channel that is selected for use by the private network implemented by the system 700 may be influenced or determined based on the amount of interference measured in response to the RF survey. In addition, whether the private network continues to use that channel that it is originally assigned may depend upon the results of the RF survey. For example, selection of frequency channel f2 for the GAA may be appropriate at the time the selection is made. However, at some time in the future (i.e., either short term or long term future), the RF survey may indicate that a new interfering system is present or that the RF environment has otherwise changed. In that case, the Sub-channel Assignment Unit 1006 within the IMU 714 can determine that there are potentially other frequency channels that might be less impacted by interference from adjacent channel cross interference.

Figure 15:
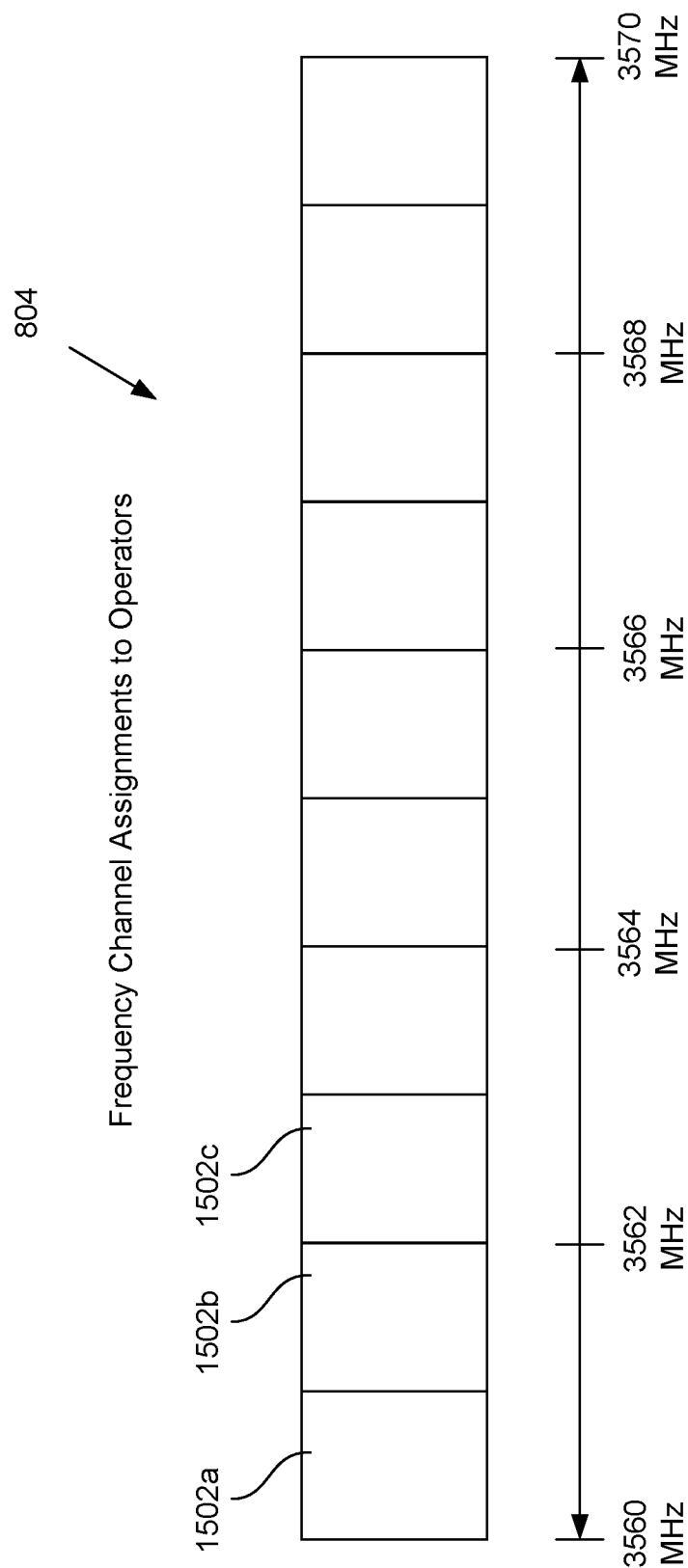
FIG. 15 is an illustration of sub-channels that can be defined within the frequency channel f2 in accordance with some embodiments of the disclosed method and apparatus.

FIG. 15 is an illustration of sub-channels that can be defined within the frequency channel 2 in accordance with some embodiments of the disclosed method and apparatus. Accordingly, in addition to selecting the frequency range 804 in which the private network operates, sub-channels 1502 are defined within the frequency channel f2. In the example shown, the frequency channel f2 is divided into 10 equal sub-channels 1502. Each sub-channel 1502 is 1 MHz wide. The first sub-channel 1502a begins at 3560 MHz and ends at 3561 MHz. A Sub-channel Assignment Unit 1006 within the IMU 714 uses the results of the RF environmental survey and information regarding the particular QoS requirements for each traffic flow to determine the particular sub-channel assignments.

A similar message flow to that shown in FIG. 11 and FIG. 14 occurs between the BS/AP 704, the server MAC 714, the IMU 712 and the Network Operations Unit 718 to allocate sub-channels based on the results of the RF environmental survey.

Coax Away a Potential Interference

In some embodiments of the disclosed method and apparatus, when an RF environmental survey determines that a particular UE 505b is causing cross channel interference, the Resource Allocation Unit 1008 within the IMU 714 makes an attempt to move the UE 505b to another channel in order to reduce the potential interference. For example, in one such case, a UE 505b is causing cross channel interference affecting the operation of the UE 702 within the private network serviced by BS/AP 704. In some such embodiments, the Resource Allocation Unit 1008 within the IMU 714 communicates with the WAN network on which the UE 505b is communicating to request that the WAN enlarge the UE specific Cell Individual Offset (CIO) parameter used by the network of the UE 505b in such a way that the UE 505b is biased in favor of communicating over a different channel of the WAN network. In another embodiment, the Resource Allocation Unit 1008 within the server 710 communicates with the WAN network and provides the details of the information about UE 505b, requesting that UE 505b to be moved to another frequency channel (i.e., frequency channel f4 (not shown)) that is not adjacent to frequency channel (f2). In another alternative embodiment, Resource Allocation Unit 1008 within the server 710 facilitates adding the public land mobile network (PLMN) of BS/AP 704 to be an allowed roaming PLMN for UE 505b for a predetermined amount of time. The server 710 coordinates with the WAN to perform a handover of UE 505b to BS/AP 704 temporarily. In yet another embodiment, the Resource Allocation Unit 1008 within the server 710 directs BS/AP 704 to increase its downlink transmit power. Doing so may encourage the UE 505b to start an inter-frequency handover to another channel.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A communications system comprising:
a) an interference mitigation unit (IMU) comprising a processor, memory and at least one input/output (I/O) port, the processor configured to:
   i) output RF environment survey instructions from the at least one I/O port to cause a plurality of recipients to measure signals received within a predetermined frequency range;
   ii) receive through the at least one I/O port, in response to the RF environment survey instructions, measurements indicating the RF environment;
   iii) determine whether to use guard bands in transmissions;
   iv) output information regarding the guard band if a determination is made to use the guard bands;
b) a Network Operations Unit comprising a processor and coupled to the IMU, the processor configured to:
   i) receive the information regarding the guard band from the IMU; and ii) in response to the received guard band information, output instructions to cause at least one of the recipients to transmit with the guard bands; and
c) further including a Medium Access Control sub-layer module (server MAC) configured to:
   i) receive from the IMU the RF environmental survey instructions;
   ii) transmit the RF environmental survey instructions to the plurality of recipients;
   iii) receive measurements from the at least one of the plurality of recipients in response to the RF environmental survey instructions;
   iv) prepare a report based on the receive measurements;
   v) transmit the report to the IMU; and
   vi) receive guard band instructions from the Network Operations Unit;
   and wherein the IMU is further configured to receive the report prepared by the server MAC and determine whether to use guard bands in response to information provided in the report.

2. The communication system of claim 1, wherein the plurality of recipients includes base station/access points (BS/APs).

3. The communication system of claim 2, wherein the environment survey instructions output by the IMU cause the BS/APs to measure signals within a predetermined frequency range.

4. The communication system of claim 1, wherein the plurality of recipients includes user equipment (UEs).

5. The communication system of claim 4, wherein the environment survey instructions output by the IMU cause the UEs to measure signals within a predetermined frequency range.

\* \* \* \* \*

UNITED STATES PATENT AND TRADEMARK OFFICE
CERTIFICATE OF CORRECTION

| | | |
|---|---|---|
| PATENT NO. | : 11,075,708 B2 | |
| APPLICATION NO. | : 16/703560 | |
| DATED | : July 27, 2021 | |
| INVENTOR(S) | : Yavuz et al. | |

It is certified that error appears in the above-identified patent and that said Letters Patent is hereby corrected as shown below:

On the Title Page

Item (73) Assignee "pSemi Corporation" should be replaced with --Celona, Inc.--.

Signed and Sealed this
Ninth Day of May, 2023

Katherine Kelly Vidal
*Director of the United States Patent and Trademark Office*